LIGHT PEN DETECTION VERIFICATION DISPLAY SYSTEM
Filed Oct. 17, 1966
FIG. 1
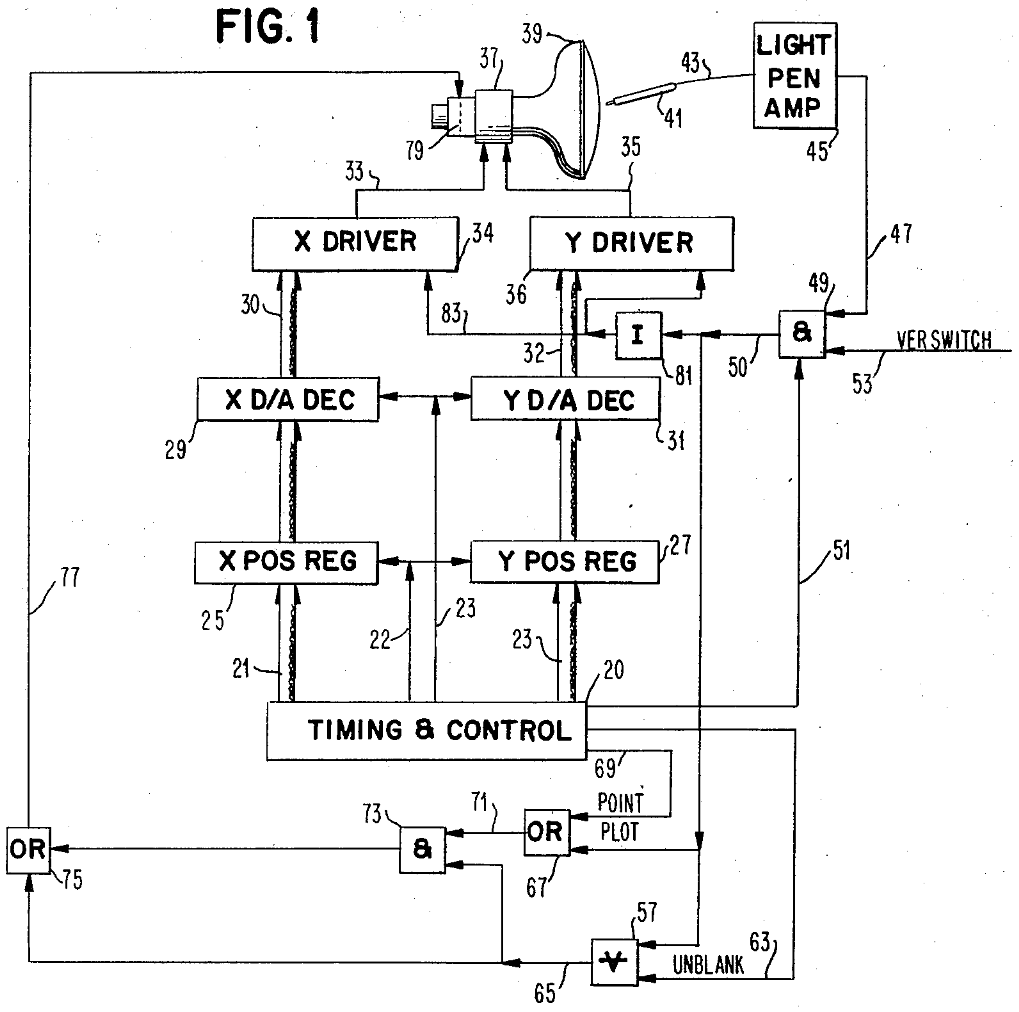
FIG. 2
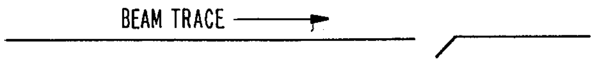
FIG. 2a
FIG. 2b
INVENTOR
RALPH J. GUNDRUM
BY [signature]
ATTORNEY United States Patent Office
3,509,350
Patented Apr. 28, 1970

3,509,350

LIGHT PEN DETECTION VERIFICATION DISPLAY SYSTEM

Ralph J. Gundrum, Rhinebeck, N.Y., assignor to International Business Machines Corporation, Armonk, N.Y., a corporation of New York Filed Oct. 17, 1966, Ser. No. 587,183
Int. Cl. G02f 1/28
U.S. Cl. 250—217 8 Claims

ABSTRACT OF THE DISCLOSURE

Where display criteria are closely positioned, it is essential to indicate to the operator that the specified criteria on the face of a CRT display has been detected by a light transducer rather than an adjacent criteria, since the selected criteria may form the basis for subsequent data processing. A detection verification system provides a visual verification of the detection by altering the detected symbol or pattern. Alteration takes the form of distortion by modifying the deflection signals and reversing the blank/unblank condition of the CRT for a predetermined interval such that the alteration is immediately visible to the operator.

The present invention relates to display systems and techniques and more particularly to a light pen verification system associated with a cathode ray tube display.

In certain systems such as image processing or graphic display systems used for man-machine communications, a cathode ray tube display having light pen detection and tracking capabilities and an associated data processor are used in varied applications as, for example, computer aided design. Such operations are uniquely adaptable to these systems where an operator designs or modifies an existing design which is available for immediate viewing. Computer aided design may be accomplished by light pen tracking, which is the capability of a point of light or symbol displayed on the CRT screen to follow the motion of the external transducer or light pen. Light pen detection is employed to identify graphic information on the CRT which may then be manipulated and/or processed by the associated data processor. The light pen and CRT display constitutes a versatile combination for which new applications are being continuously discovered.

One of the problems encountered in computer manipulation of graphic data is that of verifying to the operator that the point, symbol or line to be manipulated is in fact the item detected by the light pen, since normally there is no visual verification. Light pen verification represents a significant problem, particularly where several targets are within the field of view of the light pen, or where the lines or symbols are so closely positioned that discrimination is beyond the capabilities of the optical light pen system. The term "target" as herein employed is used to designate a point of light, vector, line or symbol selected for manipulation. The parallax problem associated with cathode ray tube display further compounds the difficulty of the operator in selecting a particular target.

In light pen tracking, the light pen includes a light sensitive transducer which detects a light pulse whenever an element within the field of view of the transducer is initially intensified or reintensified. As the selected light spot is generated or retraced, there is a blue flash visible to the light pen, followed by a relatively yellow decay, the blue flash causing the transducer within the light pen to emit a pulse upon detection. This detection signal may then be employed to initiate one of various operator or computer controlled programs, the program assumption being that the specified symbol has been detected. However, if the wrong target is detected by the light pen, the error may not become immediately evident to the operator, but only at a much later time in the program or routine, at which time another attempt at light pen detection must be made and the entire program or routine repeated. Thus it is desirable to have a means of visually verifying to the operator that the point, symbol or line specified by the operator is in fact the one detected by the light pen.

In accordance with the present invention, there is provided a light pen detection verification system. Basically, the present invention identifies the selected symbol by distorting the image selected by the light pen to provide an immediate visual verification. More specifically, the distortion is attained by both modifying the deflection of the electron beam and reversing its blank/unblank condition for a predetermined interval. By deflecting and reversing the normal blank/unblank condition of the beam in response to a detection signal, the selected image is noticeably and unmistakedly distorted. If the selected image is a character, for example, which is generated by a sequence of strokes, the distortion may occur at any part of the character depending upon the stroke where the light was first detected. The distortion may occur at any portion of the symbol so there is no requirement for precise detection or timing considerations and in the logical implementation is considerably simplified. Only a nominal amount of additional logic over that required to perform the light pen detection function is required for light pen verification. The subject invention, by providing a visual verification, results in more effective operator control, time saving by preventing errors from being sent to the central processing unit and additional advantages related to light pen operation more fully described hereinafter.

Accordingly, a primary object of the present invention is to provide a light pen detection verification system.

Another object of the invention is to provide a visual verification of light detection by an electro-optical transducer on a cathode ray tube display.

A further object of the present invention is to provide a transducer detection verification in which the detected image or symbol is visually modified to provide an immediate visual verification.

Still another object of the present invention is to provide an improved cathode ray tube display system including a light pen detection verification system in which the selected symbol is visually modified by reversing the blank and unblank condition and modifying the deflection signal for a predetermined interval.

The foregoing and other objects, features and advantages of the invention will be apparent from the following more particular description of a preferred embodiment of the invention as illustrated in the accompanying drawings.

In the drawings:

FIGURE 1 illustrates in block logical form a preferred embodiment of the present invention.

FIGURES 2*a* and 2*b* illustrate symbol modifications resulting from operation of the verification system shown in FIGURE 1.

Before referring to the drawings, a brief description of the environmental display system with which the present invention is designed to operate will be provided. A graphic display system has three modes of operation, vector, point plot and character generation, the specific details of which are not necessary to an understanding of the present invention and in the interest of clarity will be identified only by appropriately labeled control lines. The environmental display system comprises a cathode ray tube which might cover a 12 x 12 inch image area, which in turn is divided into 1024 x 1024 addressable raster units. Interconnecting between any set of intersections is defined as a vector mode of operation, a display identified by the illumination of a number of intersecting raster units is defined as point plot operation, while character generation may be accomplished by point plot or vector mode, the latter defining the character as a sequence of strokes. Point plot operation is also employed to designate a point plot level of intensity, which in the preferred embodiment herein described is +15 volts. The subject invention will be described with respect to a point plot mode, recognizing the capability of the invention relative to the other above described modes. For purposes of illustration, the display device herein described will be assumed to be operating in conjunction with a data processing unit. The data processing unit as such is not considered a part of the subject invention, and the specific details thereof, except as a source of command or control signals, have been omitted from the ensuing description in the interest of clarity.

Referring now to the drawings and more particularly to FIGURE 1 thereof, there is illustrated in block logic form a preferred embodiment of the subject invention. Control signals for initially positioning the CRT beam are applied from a timing and control circuit 20 via cables 21 and 23 to X and Y position registers 25 and 27 respectively, which contain the deflection signals in digital form. Such signals might originate for example from a buffer memory associated with the display terminal or a data processor. These signals, when converted to analog form via D/A converters 29 and 31 are applied via cables 30 and 32 to X and Y drivers 34 and 36 respectively. The output of the X and Y drivers are applied via lines 33 and 35 to magnetic yoke 37 to position a light spot or symbol on the face of the CRT 29. For ease of description, the present invention will be described in terms of light pen tracking as well as the modes enumerated above. An example of a light pen tracking system is fully shown and described in copending application Ser. No. 422,844, now U.S. Patent No. 3,337,860, "Display Tracking System," filed by Almerin C. O'Hara, Jr., Dec. 31, 1964, and assigned to the assignee of the instant invention.

Associated with cathode ray tube 39 is a light pen 41, which comprises a light transducer which is actuated by generation or regeneration of a spot of light on the screen of cathode ray tube 39 within its field of view to transmit a signal indicative of detection to an output device, which in the instant invention comprises a light pen amplifier 45. Light transducers in the form of light pens, pencils, guns, etc. are well known in the art, an example of a light gun being shown in U.S. Patent 2,915,643, entitled "Light Gun Assembly," issued to R. G. Mork, Dec. 1, 1959. The light detection signal is converted to an electrical signal in light amplifier 45, and the resultant signal on line 47 is applied to logical AND circuit 49, which has two additional inputs, a logic control signal on line 51 from timing and control 20 energized during a light pen detect operation and a manually applied light pen verification switch signal 53. The two control inputs permit manual and computer control of the verification operation.

Broadly, the present invention provides the function of character distortion used for visual verification in two distinct ways. The X and Y drivers 34 and 36, which provide the deflection signals to the CRT yoke, are modified so that the item detected is displaced approximately 45 degrees to the left and below its normal position, while blanking control logic circuitry is used to reverse the normal unblank condition to a blank condition for a predetermined interval. The 45° displacement was selected so that a common modification signal could be applied to the horizontal and vertical selection. Since the interval required to generate the display is always greater than the unblank interval, the display is never obliterated or completely blanked but will be shown as having a portion of the item detected in the blanked condition. The output of logical AND circuit 49 on line 50 is inverted and applied to the X driver 34 and Y driver 36, thus accomplishing the character distortion.

The blanking of the CRT beam is controlled by detection verification logic in the following manner. Exclusive OR circuit 57 has two input conditions, the output signal from logical AND circuit 49 on line 50 and a controlled unblanking pulse provided from timing and control circuit 20 on line 63. Since the signal on line 55 represents the light pen detect condition, either this condition or the unblanked condition but not both will provide an output on line 65. The signal indicating light pen detection on line 55 is also applied to logical OR circuit 67, the second input on line 69 constituting a control signal designating the point plot mode of operation. The output from logical OR circuit 67 on line 71 is applied as one of the inputs to logical AND circuit 73, the second input of which is the output from exclusive OR circuit 57 on line 65. The output of both the exclusive OR circuit 57 and logical AND circuit 73 are applied through logical OR circuit 75 and line 77 to the control grid 79 of CRT 39 to accomplish the blank/unblank control.

With respect to operation of the deflection verification logic, the output of exclusive OR circuit 57 may be defined by the Boolean Expression $LP\cdot\overline{UNBL}+\overline{LP}\cdot UNBL$ where LP designates a light pen detect condition, and will, if present, raise the CRT from its blanked level of −30 volts to ground, unblanked at a relatively low intensity level. The output of logical AND circuit 73 may be defined by the Boolean Expression $$(LP\cdot\overline{UNBL})+PP(LP\cdot\overline{UNBL}+\overline{LP}\cdot UNBL)$$

where PP designates a point plot mode, which will, if present, raise the CRT grid 79 to +15 volts which as previously indicated is the normal intensity in point plot mode and designated the point plot level.

The Boolean Expression may be further clarified by the truth table shown in Table I. Defining the output of light pen 41 as a binary 1 signifying detection and a binary 0 if no detect, the point plot mode as a binary 1, the output of logical AND circuit 73 as 1 or 0 and the output of exclusive OR 57 as a 1 or 0, these are related in the following manner to produce a control grid voltage which is either blanked or unblanked at normal intensity level (0) or point plot level (+15) volts.

TABLE I

| LP | UNBL | PP | AND 73 | V57 | Grid voltage |
|---|---|---|---|---|---|
| 0 | 0 | 0 | 0 | 0 | −30 |
| 0 | 0 | 1 | 0 | 0 | −30 |
| 0 | 1 | 0 | 0 | 1 | 0 |
| 0 | 1 | 1 | 1 | 1 | +15 |
| 1 | 0 | 0 | 1 | 1 | +15 |
| 1 | 0 | 1 | 1 | 1 | +15 |
| 1 | 1 | 0 | 0 | 0 | −35 |
| 1 | 1 | 1 | 0 | 0 | −30 |

From the above description and truth table, it is noted that three different signal levels are employed, while the device is operated in terms of binary logic. It is noted from the truth table that the 0 grid voltage, unblanked at a relatively low signal level, is not associated with the detection verification of the instant invention but has been included merely to define the normal unblank operating level of the display system associated with the instant invention. However, if it is desired to use three levels as shown in the truth table, logical OR circuit 75 could be replaced by a simple conventional binary two bit decoder with inputs from logical AND circuit 73 and exclusive OR circuit 57 to select one of the three identified levels to be applied to the control grid of the CRT.

The above description and accompanying truth table describe the blank/unblank reversal of the subject invention. The second condition caused by the light pen detection is the character distortion which occurs as a result of the light pen detection, which is most evident in character and point plot modes. The output from the light pen amplifier is applied to the logical AND circuit 49, and assuming the logical AND circuit is conditioned by the remaining two inputs previously described, the resultant output representing a DC level will be applied to modify the analog deflection circuitry in the X and Y drivers. Since the preferred embodiment has been described in terms of positive logic and since the character displacement herein described causes the character to be repositioned to the left and downward, the positive output from the logical AND circuit 57 will be inverted by inverter 81 to provide an equal negative DC level to the X and Y drivers 34 and 36 through line 83, thus positioning the characters at a 45 degree angle to the left and downward.

Referring briefly to FIGURE 2, there is shown several illustrative distortions which occur upon detection by the subject invention. FIGURE 2*a* illustrates the result of detection when the display system is operating in vector mode. As previously indicated, the detected vector is blanked 1–4 microseconds after detection, while the distortion occurs for a two microsecond interval. The vector is blanked for this interval and when unblanked after this interval resumes at a point displayed 45 degrees to the lower left of the original line. FIGURE 2*b* illustrates various distortions which may occur in the character and point plot modes of operation. The initial FIGURE 2*b* illustrates the character W as it would normally appear and the following four illustrations show various configurations which may occur when the character is detected at different strokes. In each of the illustrations the character is obviously distorted, the particular distortion depending upon where the character is initially detected. Detection of a point in point plot mode operation is illustrated in the rightmost figure of FIG. 2*b* where the blanking is reversed to unblank and the detected point repositioned as previously described.

While the subject invention has been described in its simplest embodiment for use with a graphic processing system, it is adaptable for other applications not necessarily involving a processor. For example, the invention may be employed as an alignment aid of the display system in which the light pen sensitivity is adjusted to fire at some desirable level. In certain graphic processing operations not involving light pen tracking, it may be desirable to know the direction in which a particular vector is being traced. The manner in which the distortion occurs provides a visual indication of the direction of beam trace, as shown FIGURE 2*a*. The system provides increased effective resolution of the pen's field of view, more effective operator control with a high degree of detection accuracy which results in a system and programming time saved at a resultant low cost. An additional benefit afforded by the subject invention is an immediate indication of faulty light pen operation since incorrect signals will cause spurious verification indications over the entire display.

While the subject invention has been shown in single block form in the interest of clarity, it will be appreciated that in practice a multi-digit system such as the 10 bit system shown in the aforenoted copending application 422,844 is contemplated. In general, the size of the system would be controlled by the word size employed in the associated processor.

While the invention has been particularly shown and described with reference to a preferred embodiment thereof, it will be understood by those skilled in the art that various changes in form and details may be made therein without departing from the spirit and scope of the invention.

What is claimed is:

1. A light transducer detection verification system comprising in combination:

a cathode ray tube having deflection and intensity control means, means for generating a display indicia on the screen of said cathode ray tube, a light transducer for detecting said display indicia, and means responsive to the detection of said indicia by said light transducer for providing a visual verification of said detection.

2. A device of the character claimed in claim 1 wherein said light transducer comprises a photo sensing device for providing an electrical signal in response to detection of said indicia.

3. Apparatus of the character claimed in claim 2 wherein said means for providing a visual verification of said detection comprises means for distorting the appearance of said display indicia.

4. Apparatus of the type claimed in claim 3 wherein said means for distorting the appearance of said display indicia includes deflection and intensity modification of said indicia.

5. Apparatus of the type claimed in claim 4 wherein said deflection modification means repositions said displayed indicia or a portion thereof.

6. Apparatus of the type claimed in claim 4 wherein said beam control means comprises a logical configuration responsive to said detection for reversing the normal beam blanking condition of said display for a predetermined interval.

7. In a display system, apparatus for verifying that a selected display indicia has been detected by a light transducer comprising in combination:

a cathode ray tube having beam deflection and intensity control means, means for generating a display indicia on the screen of said cathode ray tube, an optical light transducer comprising a photo sensing apparatus, said light transducer being responsive to the initial detection of a portion of said display indicia within the field of view of said optical transducer for generating a signal indicative of said detection, and means responsive to said signal indicative of said detection for modifying the appearance of said indica, said means including deflection and intensity modification whereby the appearance of said indicia or a portion thereof is altered to provide a visual indication that said selected indicia has been detected.

8. Apparatus of the character claimed in claim 7 wherein said intensity modification means includes a logical configuration for reversing the normal blanking condition of said beam during said modification.

References Cited

UNITED STATES PATENTS 3,337,860 8/1967 O'Hara ............ 178—19

RALPH G. NILSON, Primary Examiner

M. ABRAMSON, Assistant Examiner

U.S. Cl. X.R.

340—146.3, 324